US010088574B2

(12) United States Patent
Murphy

(10) Patent No.: US 10,088,574 B2
(45) Date of Patent: Oct. 2, 2018

(54) AIRCRAFT DISTRESS TRACKING AND INTERFACE TO SEARCH AND RESCUE SYSTEM

(71) Applicant: The Boeing Company, Chicago, IL (US)

(72) Inventor: Timothy Allen Murphy, Everett, WA (US)

(73) Assignee: The Boeing Company, Chicago, IL (US)

(*) Notice: Subject to any disclaimer, the term of this patent is extended or adjusted under 35 U.S.C. 154(b) by 317 days.

(21) Appl. No.: 14/832,851

(22) Filed: Aug. 21, 2015

(65) Prior Publication Data
US 2017/0052259 A1    Feb. 23, 2017

(51) Int. Cl.
*G01S 19/48*  (2010.01)
*G01S 19/17*  (2010.01)
*G01S 1/68*   (2006.01)
*G01S 5/02*   (2010.01)
*B64D 45/00*  (2006.01)
*B64D 25/20*  (2006.01)

(52) U.S. Cl.
CPC ............... *G01S 19/17* (2013.01); *G01S 1/68* (2013.01); *G01S 5/0231* (2013.01); *B64D 25/20* (2013.01); *B64D 2045/0045* (2013.01); *B64D 2045/0065* (2013.01)

(58) Field of Classification Search
CPC .......... G01S 19/17; G01S 5/0231; G01S 1/68; B64D 25/20; B64D 2045/0045; B64D 2045/0065
USPC .............................. 342/385, 357.31; 340/981
See application file for complete search history.

(56) References Cited

U.S. PATENT DOCUMENTS

| | | | | |
|---|---|---|---|---|
| 5,311,197 A * | 5/1994 | Sorden | ................ | B60R 25/102 342/357.31 |
| 5,367,306 A * | 11/1994 | Hollon | .................... | G01S 1/68 342/357.31 |
| 7,158,053 B2 * | 1/2007 | Crank | .............. | B64D 45/0015 340/5.52 |
| 7,196,621 B2 | 3/2007 | Kochis | | |
| 7,215,282 B2 * | 5/2007 | Boling | ............... | G08B 25/016 340/539.13 |

(Continued)

OTHER PUBLICATIONS

Extended European Search Report, and Search Opinion, dated Feb. 21, 2017, Regarding Application No. 16184606.8, 8 Pages.

(Continued)

*Primary Examiner* — Chuong P Nguyen
(74) *Attorney, Agent, or Firm* — Yee & Associates, P.C.

(57) ABSTRACT

An apparatus and method of delivering an alert from an aircraft to a search and rescue system. An alert from an aircraft is received via a communications satellite. The alert comprises identification information identifying the aircraft and position information identifying the position of the aircraft. In response to receiving the alert, an emulated distress radio beacon signal is generated. The emulated distress radio beacon signal comprises the identification information and the position information in a standard format of a signal generated by a distress radio beacon. The emulated distress radio beacon signal is broadcast from a location other than the aircraft as an emulated distress radio beacon transmission that is configured to be received and processed by the search and rescue system.

19 Claims, 9 Drawing Sheets

(56) References Cited

U.S. PATENT DOCUMENTS

| | | | |
|---|---|---|---|
| 7,218,227 B2 | 5/2007 | Davis et al. | |
| 7,245,899 B2 * | 7/2007 | Carle | A62B 33/00 |
| | | | 370/328 |
| 7,898,425 B2 | 3/2011 | Nagy et al. | |
| 7,948,401 B2 * | 5/2011 | Wartofsky | G08B 25/016 |
| | | | 340/945 |
| 9,031,497 B1 | 5/2015 | Hoffman et al. | |
| 9,049,585 B1 | 6/2015 | Hoffman et al. | |
| 9,178,601 B1 * | 11/2015 | Hoffman | H04B 7/1851 |
| 9,330,554 B2 | 5/2016 | Calvar Anton | B63C 9/08 |
| 2003/0130771 A1 | 7/2003 | Crank | |
| 2008/0024365 A1 * | 1/2008 | Holmes | G01S 5/04 |
| | | | 342/418 |
| 2008/0174484 A1 | 7/2008 | Katz | |
| 2008/0191863 A1 | 8/2008 | Boling et al. | |
| 2011/0122019 A1 * | 5/2011 | Lee | G01S 5/0231 |
| | | | 342/357.25 |
| 2012/0098699 A1 * | 4/2012 | Calmettes | G01S 19/17 |
| | | | 342/357.25 |
| 2013/0093625 A1 * | 4/2013 | Smith | G01S 5/0081 |
| | | | 342/387 |
| 2014/0354481 A1 * | 12/2014 | Holmes | G01S 19/11 |
| | | | 342/465 |
| 2016/0003933 A1 * | 1/2016 | Calmettes | G01S 5/0072 |
| | | | 342/357.25 |
| 2017/0106997 A1 * | 4/2017 | Bekanich | B64D 45/00 |
| 2017/0247118 A1 * | 8/2017 | Adler | B64D 45/00 |

OTHER PUBLICATIONS

Maqsood Ahmed, "Satellite-aided Search and Rescue (SAR) System," Advances in Space Technologies, 2006, International Conference on Sep. 1, 2006, pp. 43-48.

\* cited by examiner

AIRCRAFT DISTRESS TRACKING AND INTERFACE TO SEARCH AND RESCUE SYSTEM

BACKGROUND INFORMATION

1. Field

The present disclosure relates generally to identifying, locating, and responding to an aircraft in distress. More particularly, the present disclosure relates to a method and apparatus for delivering an alert from an aircraft to a search and rescue system for responding to the aircraft in distress.

2. Background

Many aircraft carry distress radio beacons. Distress radio beacons may be known as emergency beacons or by other names. For example, without limitation, many commercial passenger aircraft and other aircraft may carry a distress radio beacon known as an emergency locator transmitter, ELT.

An emergency locator transmitter on an aircraft is intended to aid in locating the aircraft after a crash. An emergency locator transmitter on an aircraft may be manually or automatically activated to send out a distress signal when the aircraft is in distress. For example, without limitation, an emergency locator transmitter may be activated to transmit a distress signal automatically upon immersion in water or when another condition indicating that the aircraft is in distress is detected.

A search and rescue system may detect a distress signal generated by an emergency locator transmitter or other distress radio beacon on an aircraft and respond in an appropriate manner. For example, COSPAS-SARSAT is an international humanitarian search and rescue system for locating and responding to aircraft, ships, or individuals in distress. The COSPAS-SARSAT system includes a network of satellites, ground stations, mission control centers, and rescue coordination centers.

COSPAS-SARSAT uses satellites to detect distress signal transmissions from emergency locator transmitters on aircraft. The signal from an emergency locator transmitter on an aircraft is received by a satellite in the COSPAS-SARSAT system and relayed to the nearest available ground station. The ground station, called a Local User Terminal, processes the signal and determines the position from which it originated. The primary means for determining the position of the transmission from the emergency locator transmitter is using satellite orbit information and signal Doppler measurements. In some cases, an emergency locator transmitter may be configured to determine its location using a satellite navigation system receiver that is either integrated into the emergency locator transmitter or fed by a satellite navigation system receiver that is not part of the emergency locator transmitter.

Information identifying the position of the emergency locator transmitter is transmitted from the ground station to a mission control center where it is joined with identification data and other information associated with the emergency locator transmitter. The mission control center then transmits an alert message to an appropriate rescue coordination center based on the determined geographic location of the detected transmission from the emergency locator transmitter and other available information.

Current emergency locator transmitters may have several limitations. For example, position information provided by current emergency locator transmitters may not be sufficiently accurate or provided in a sufficiently reliable manner to locate an aircraft in distress effectively. The majority of currently fielded emergency locator transmitters do not provide position information directly. The location of the emergency locator transmitter is determined by radio frequency direction finding or multilateration through satellite links. This process may take an undesirably long time and may not be sufficiently reliable.

The weight of current emergency locator transmitters may be relatively high. Maintenance requirements for current emergency locator transmitters also may be relatively high. For example, most emergency locator transmitters fitted to aircraft today are powered by a non-rechargeable battery that is relatively heavy and must be maintained appropriately to ensure reliable operation and to prevent any undesired condition from occurring. It also may be relatively difficult to reduce or eliminate undesirable tampering with current emergency locator transmitters.

Accordingly, it would be beneficial to have a method and apparatus that take into account one or more of the issues discussed above, as well as possible other issues.

SUMMARY

The illustrative embodiments of the present disclosure provide a method of delivering an alert from an aircraft to a search and rescue system. An alert from the aircraft is received via a communications satellite. The alert comprises identification information identifying the aircraft and position information identifying a position of the aircraft. In response to receiving the alert, an emulated distress radio beacon signal is generated. The emulated distress radio beacon signal includes the identification information and the position information in a standard format of a signal generated by a distress radio beacon. The emulated distress radio beacon signal is broadcast from a location other than the aircraft as an emulated distress radio beacon transmission that is configured to be received and processed by the search and rescue system.

The illustrative embodiments of the present disclosure also provide an apparatus comprising a receiver, a formatter, and a transmitter. The receiver is configured to receive an alert from an aircraft via a communications satellite. The alert comprises identification information identifying the aircraft and position information identifying the position of the aircraft. The formatter is configured to generate an emulated distress radio beacon signal comprising the identification information and the position information in a standard format of a signal generated by a distress radio beacon. The transmitter is configured to broadcast the emulated distress radio beacon signal from a location other than the aircraft as an emulated distress radio beacon transmission that is configured to be received and processed by a search and rescue system.

The illustrative embodiments also provide a system comprising a tracking device on an aircraft, an aircraft tracking system, and a search and rescue system. The tracking device is configured to send an alert from the aircraft via a communications satellite, wherein the alert comprises identification information identifying the aircraft and position information identifying the position of the aircraft. The aircraft tracking system is configured to receive the alert from the aircraft, generate an emulated distress radio beacon signal comprising the identification information and the position information in a standard format of a signal generated by a distress radio beacon, and broadcast the emulated distress radio beacon signal from a location other than the aircraft as an emulated distress radio beacon transmission. The search and rescue system is configured to receive the emulated distress radio beacon transmission as a standard distress radio beacon transmission via a search and rescue system satellite and use the identification information and the position information to conduct a search and rescue operation.

The illustrative embodiments of the present disclosure also provide a method of using an alert from an aircraft to perform a search and rescue operation. An apparent distress radio beacon transmission comprising identification information identifying the aircraft and position information identifying a position of the aircraft is received. The identification information is used to identify registration information for the aircraft indicating whether the apparent distress radio beacon transmission is an emulated distress radio beacon transmission transmitted from a transmitter that is not a distress radio beacon located on the aircraft. The identification information and the position information are used to perform a search and rescue operation in response to a determination that the apparent distress radio beacon transmission is an emulated distress radio beacon transmission transmitted from a transmitter that is not a distress radio beacon located on the aircraft.

Various features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of illustrative embodiments of the present disclosure when read in conjunction with the accompanying drawings, wherein:

DETAILED DESCRIPTION

Different illustrative embodiments recognize and take into account a number of different considerations. "A number," as used herein with reference to items, means one or more items. For example, "a number of different considerations" are one or more different considerations.

The different illustrative embodiments recognize and take into account that many of the limitations of an emergency locator transmitter may be overcome by replacing the emergency locator transmitter on an aircraft with an Iridium based tracking system. The different illustrative embodiments also recognize, however, that the current COSPAS-SARSAT search and rescue system is not configured to receive alerts from such a tracking system.

Illustrative embodiments provide a system and method for receiving alerts and position information from a tracking device on an aircraft and re-transmitting the alerts in an appropriate format for the current COSPAS-SARSAT system. In accordance with an illustrative embodiment, an alert received from the tracking device on an aircraft may be converted into an emulated emergency locator transmitter signal that may be broadcast using a transmitter that emulates a transmission from an emergency locator transmitter.

Figure 1:
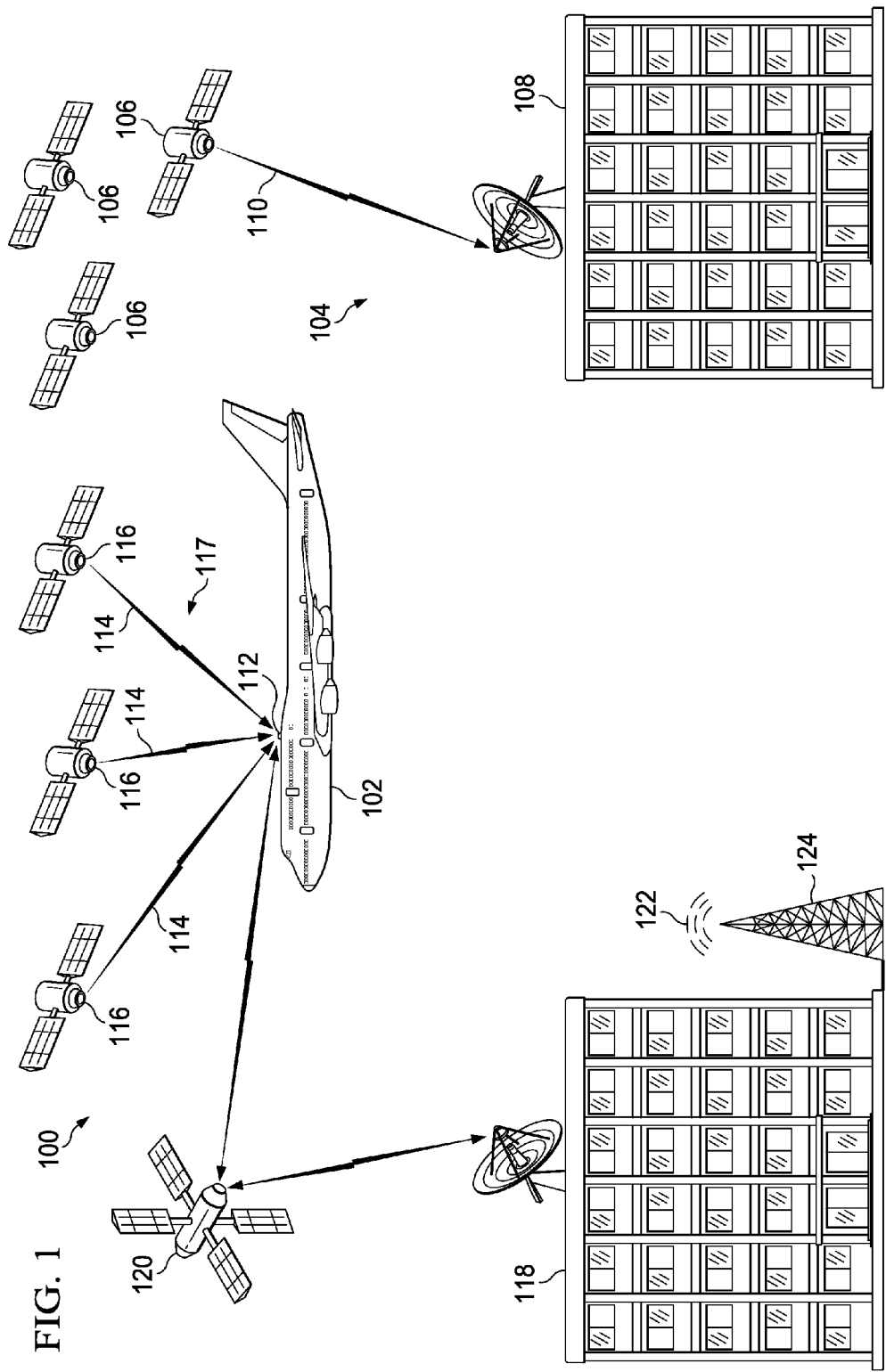
FIG. 1 is an illustration of an aircraft operating environment in accordance with an illustrative embodiment.

Turning to FIG. 1, an illustration of an aircraft operating environment is depicted in accordance with an illustrative embodiment. Aircraft operating environment 100 may include any appropriate environment in which aircraft 102 may be operated in any appropriate manner.

Aircraft 102 may be any appropriate type of aircraft that may be configured to perform any appropriate operation or mission in aircraft operating environment 100. For example, without limitation, aircraft 102 may be a commercial passenger aircraft or any other appropriate type of aircraft.

Aircraft operating environment 100 may include search and rescue system 104. Search and rescue system 104 may comprise various systems and personnel for responding to an indication that aircraft 102 is in distress. For example, without limitation, search and rescue system 104 may comprise the COSPAS-SARSAT search and rescue system.

Search and rescue system 104 may comprise search and rescue system satellites 106 and ground facilities 108. Search and rescue system satellites 106 may comprise satellites in low Earth orbit, satellites in geostationary orbits, or both. Search and rescues system satellites are configured to detect transmissions from distress radio beacons, such as emergency locator transmitters, and to rely such transmissions to ground facilities 108.

Ground facilities 108 are configured to receive the relayed distress radio beacon transmissions from search and rescue system satellites 106, process the distress radios beacon transmissions, and conduct appropriate search and rescue operations in response. For example, without limitation, ground facilities 108 may include multiple response centers having various resources for responding to various distress situations. Ground facilities 108 may be configured to process received distress radio beacon transmissions to identify and notify the appropriate response center or centers for responding to a particular distress situation.

In accordance with an illustrative embodiment, aircraft 102 may include tracking device 112. For example, without limitation, tracking device 112 may be attached to the skin of aircraft 102 on the outside of aircraft 102. In accordance with an illustrative embodiment, tracking device 112 may be configured to determine automatically the position of aircraft 102, to determine when aircraft 102 is in distress, and to send an alert including position information identifying the position of aircraft 102 when aircraft 102 is determined to be in distress.

Tracking device 112 may be configured to identify the position of aircraft 102 using navigation signals 114 received from a number of navigation system satellites 116 in a known manner. Tracking device 112 may use navigation signals 114 received from more than three navigation system satellites 116 to determine the position of aircraft 102. For example, without limitation, navigation system satellites 116 may include satellites in satellite navigation system 117 such as the Global Positioning System, GPS, the Global Navigation Satellite System, GLONASS, other appropriate satellite navigation systems, or various combinations of satellite navigation systems that may be used by tracking device 112 to determine the position of aircraft 102.

In accordance with an illustrative embodiment, tracking device 112 on aircraft is not a conventional emergency locator transmitter or other conventional distress radio beacon. In accordance with an illustrative embodiment, tracking device 112 is configured to send an alert including position information to aircraft tracking system 118 via communications satellite 120.

For example, without limitation, aircraft tracking system 118 may be a global aircraft tracking system. Aircraft tracking system 118 may be operated by any appropriate entity. For example, without limitation, when aircraft 102 is a commercial passenger aircraft, aircraft tracking system 118 may be operated by an airline. Alternatively, aircraft tracking system 118 may be operated by a third party for a number of airlines or other operators of aircraft 102.

Communications satellite 120 may comprise any appropriate communications satellite or a plurality of communications satellites for establishing a communications link between tracking device 112 on aircraft 102 and aircraft tracking system 118. Tracking device 112 may be configured to send alerts, including position information identifying the position of aircraft 102, from tracking device 112 to aircraft tracking system 118 via the communications link established using communications satellite 120. For example, without limitation, communications satellite 120 may be a communications satellite in low Earth orbit. A satellite in low Earth orbit is in orbit around the Earth with an altitude between approximately 160 kilometers and 2000 kilometers. For example, without limitation, communications satellite 120 may be an Iridium communications satellite in the Iridium satellite constellation operated by Iridium Communications.

Search and rescue system 104 may not be configured to receive an alert transmitted from tracking device 112 on aircraft 102. In accordance with an illustrative embodiment, however, aircraft tracking system 118 may include appropriate facilities for receiving an alert transmission from tracking device 112 on aircraft 102, evaluating the alert, and transmitting the alert in an appropriate format to be received and processed by search and rescue system 104. For example, without limitation, aircraft tracking system 118 may be configured to evaluate an alert received from tracking device 112 on aircraft 102 to determine whether the alert indicates that aircraft 102 is in distress.

Appropriate action by search and rescue system 104 may be desired or required when aircraft 102 is in distress. If action from search and rescue system 104 is desired or required, aircraft tracking system 118 may generate emulated distress radio beacon signal 122. Emulated distress radio beacon signal 122 may include identification information identifying aircraft 102 and position information identifying the position of aircraft 102 as provided in the alert received from tracking device 112 on aircraft 102. Emulated distress radio beacon signal 122 may be in a standard format of a signal generated by a distress radio beacon. For example, without limitation, emulated distress radio beacon signal 122 may be in the standard format of a transmission from an emergency locator transmitter on an aircraft. Aircraft tracking system 118 may broadcast emulated distress radio beacon signal 122 as an emulated distress radio beacon transmission that is configured to be received and processed by search and rescue system 104. Emulated distress radio beacon signal 122 may be broadcast from a location that is not on aircraft 102 using any appropriate transmitter 124 that is configured to emulate a transmission from a distress radio beacon on an aircraft. For example, without limitation, transmitter 124 may be located on the ground.

Emulated distress radio beacon signal 122 may be received by search and rescue system satellites 106 and relayed to ground facilities 108 for search and rescue system 104 in a normal manner. Search and rescue system 104 thus may be notified of and respond to an alert generated by tracking device 112 on aircraft 102 without significant changes to search and rescue system 104.

Figure 2:
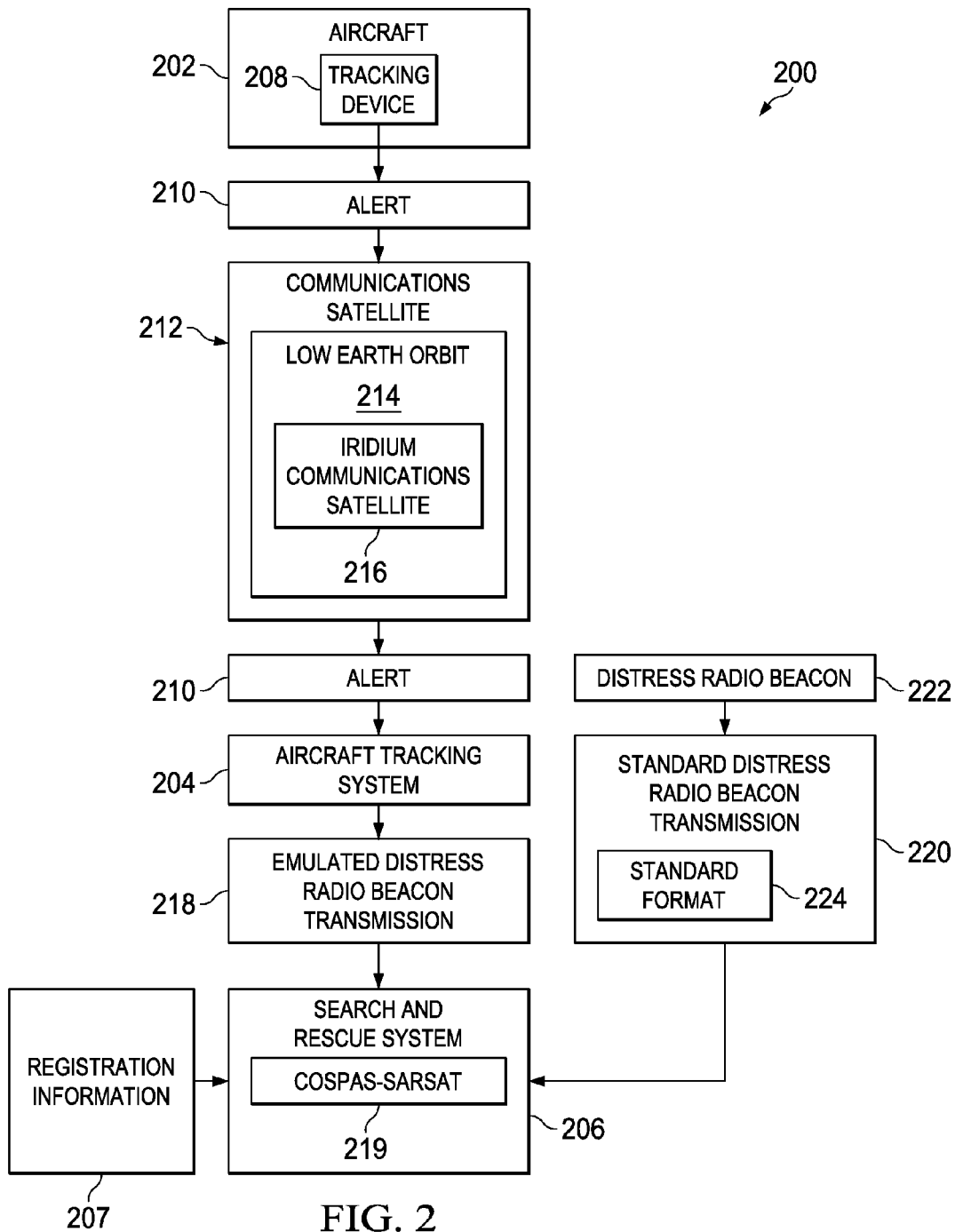
FIG. 2 is an illustration of a block diagram of an aircraft operating environment in accordance with an illustrative embodiment.

Turning to FIG. 2, an illustration of a block diagram of an aircraft operating environment is depicted in accordance with an illustrative embodiment. Aircraft operating environment 200 may be an example of one implementation of aircraft operating environment 100 in FIG. 1. Aircraft operating environment 200 may comprise aircraft 202, aircraft tracking system 204, and search and rescue system 206.

Aircraft 202 may be any appropriate type of aircraft that may be configured to perform any appropriate operation or mission in aircraft operating environment 200. For example, without limitation, aircraft 202 may be a commercial passenger aircraft, a cargo aircraft, a military aircraft, or any other appropriate type of aircraft. Aircraft 202 may be a fixed wing aircraft, a rotary wing aircraft, or a lighter-than-air aircraft. Aircraft 202 may be a manned aircraft or an unmanned aircraft.

Before operating aircraft 202 in aircraft operating environment 200, registration information 207 for aircraft 200 may be provided to search and rescue system. Registration information 207 may comprise the same type of information that would be needed by search and rescue system 206 to respond to a transmission from an actual emergency locator transmitter on an aircraft. For example, without limitation, registration information 207 may include information connecting aircraft identification information in a received distress radio beacon signal to the operator of the aircraft, appropriate contact information, an appropriate regulatory authority that should be contacted in an emergency situation, or other appropriate information. The aircraft position at the time of the distress signal reception may determine which Air Navigation Service Unit should be contacted as well.

For example, without limitation, registration information 207 may notify search and rescue system 206 that an apparent distress radio beacon transmission from aircraft 202 is not from a distress radio beacon on aircraft 202, but is from aircraft tracking system 204. Registration information is provided to search and rescue system 206 so that search and rescue system 206 may respond appropriately when an apparent distress radio beacon transmission from aircraft 202 is received by search and rescue system 206.

Aircraft 202 includes tracking device 208. Tracking device 208 may be configured to send alert 210 to aircraft tracking system 204 via communications satellite 212. Communications satellite 212 may be a communications satellite in low Earth orbit 214. For example, without limitation, communications satellite 212 may be Iridium communications satellite 216

Alert 210 may indicate that aircraft 202 is in distress and may include position information identifying the position of aircraft 202. Aircraft tracking system 204 may evaluate alert 210 and broadcast emulated distress radio beacon transmission 218. Emulated distress radio beacon transmission 218 may include information identifying aircraft 202 and position information identifying the position of aircraft 202 and may be in the form of a transmission from a distress radio beacon that can be received and processed by search and rescue system 206.

For example, without limitation, search and rescue system 206 may comprise the COSPAS-SARSAT 219 search and rescue system or another appropriate search and rescue system that may be configured to receive and process standard distress radio beacon transmission 220 from distress radio beacon 222 on an aircraft to perform a search and rescue operation. Signals in standard distress radio beacon transmission 220 from distress radio beacon 222 may be in standard format 224 of signals generated by distress radio beacon 222.

Search and rescue system 206 may receive emulated distress radio beacon transmission 218 and use the information provided in emulated distress radio beacon transmission 218 along with registration information 207 for aircraft 202 to conduct an appropriate search and rescue operation. In accordance with an illustrative embodiment, emulated distress radio beacon transmission 218 may be in standard format 224 of standard distress radio beacon transmission 220 from distress radio beacon 222 on an aircraft. Therefore, search and rescue system 206 may receive and process emulated distress radio beacon transmission 218 to conduct an appropriate search and rescue operation in the same manner or a similar manner to which standard distress radio beacon transmission 220 from distress radio beacon 222 on an aircraft is received and processed by search and rescue system 206.

Figure 3:
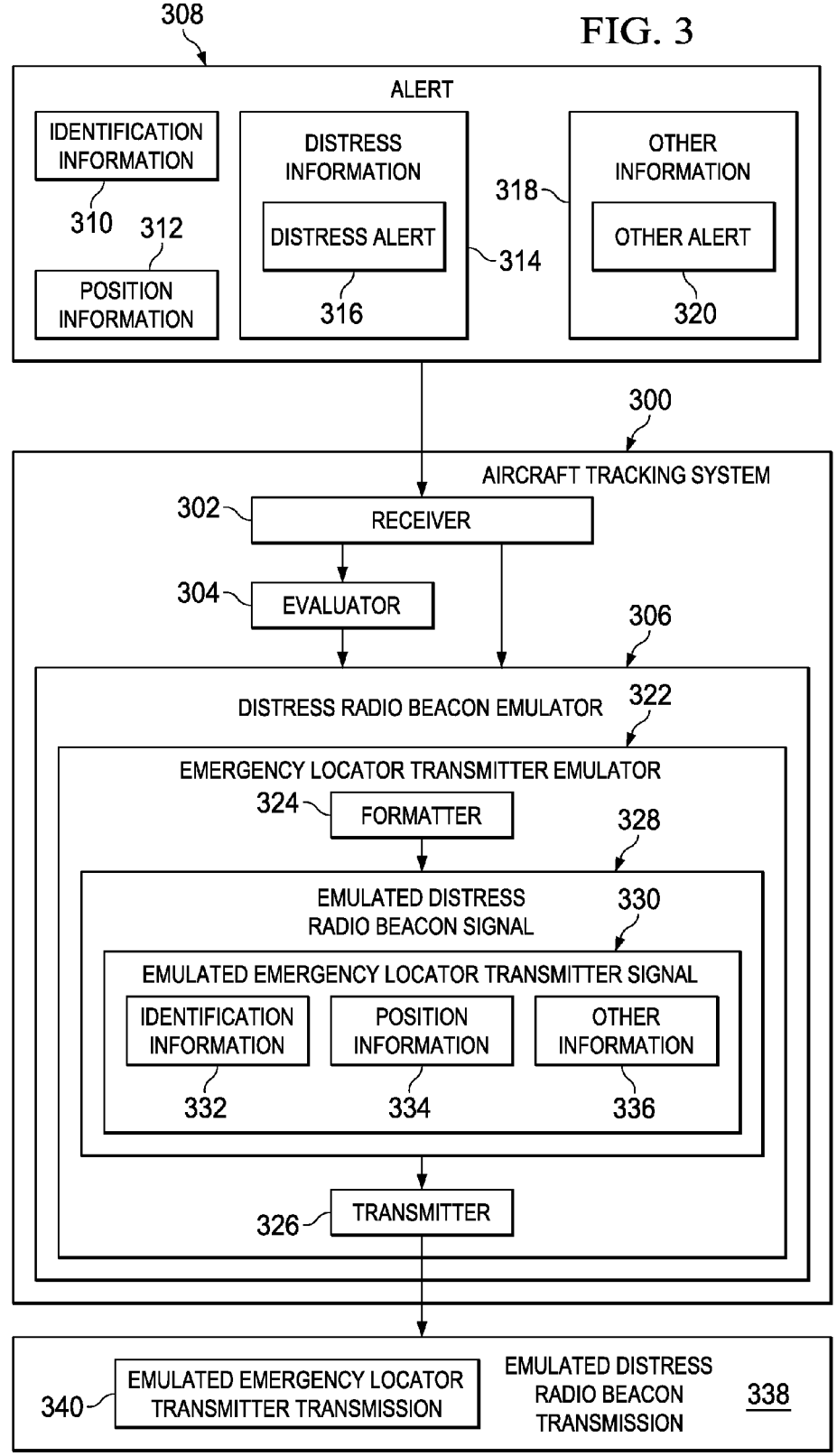
FIG. 3 is an illustration of a block diagram of an aircraft tracking system in accordance with an illustrative embodiment.

Turning to FIG. 3, an illustration of a block diagram of an aircraft tracking system is depicted in accordance with an illustrative embodiment. Aircraft tracking system 300 may be an example of one implementation of aircraft tracking system 118 in FIG. 1 and aircraft tracking system 204 in FIG. 2. Aircraft tracking system 300 may include receiver 302, evaluator 304, and distress radio beacon emulator 306.

Receiver 302 may include any appropriate communications system including a satellite communications receiver for receiving alert 308 from an aircraft via a communications satellite. Alert 308 may include identification information 310, position information 312, distress information 314, and other information 318. Distress information 314 may indicate that alert 308 is distress alert 316. Alternatively, other information 318 may indicate that alert 308 is other alert 320 other than distress alert 316.

Evaluator 304 may be configured to evaluate whether alert 308 is distress alert 316 or other alert 320. The evaluation performed by evaluator 304 may be performed automatically by a computer system or by a computer system in combination with a human operator.

For example, without limitation, distress radio beacon emulator 306 may be emergency locator transmitter emulator 322. Distress radio beacon emulator 306 may comprise formatter 324 and transmitter 326. In response to alert 308 being determined to be distress alert 316 by evaluator 304, formatter 324 may generate emulated distress radio beacon signal 328. Formatter 324 may be configured to generate emulated distress radio beacon signal 328 in a standard format of a signal generated by a distress radio beacon. For example, without limitation, emulated distress radio beacon signal 328 may be emulated emergency locator transmitter signal 330 in a standard format of a signal generated by an emergency locator transmitter. Emulated distress radio beacon signal 328 may include identification information 332 identifying the aircraft from which alert 308 was received, position information 334 identifying the position of the aircraft as identified in alert 308, and other information 336.

Transmitter 326 may be configured to broadcast emulated distress radio beacon signal 328 as emulated distress radio beacon transmission 338. For example, without limitation, transmitter 326 may be configured to broadcast emulated emergency locator transmitter signal 330 as emulated emergency locator transmitter transmission 340. For example, without limitation, emulated emergency locator transmitter transmission 340 may be encoded by formatter 324 and broadcast by transmitter 326 in accordance with emergency locator transmitter standards for signal modulation, message format, repetition rate, power, other characteristics, or various combinations of characteristics of a transmission from a standard emergency locator transmitter. For example, without limitation, transmitter 326 may broadcast emulated emergency locator transmitter transmission 340 at approximately 406 MHz or at any other appropriate frequency to emulate a transmission from a standard emergency locator transmitter.

Figure 4:
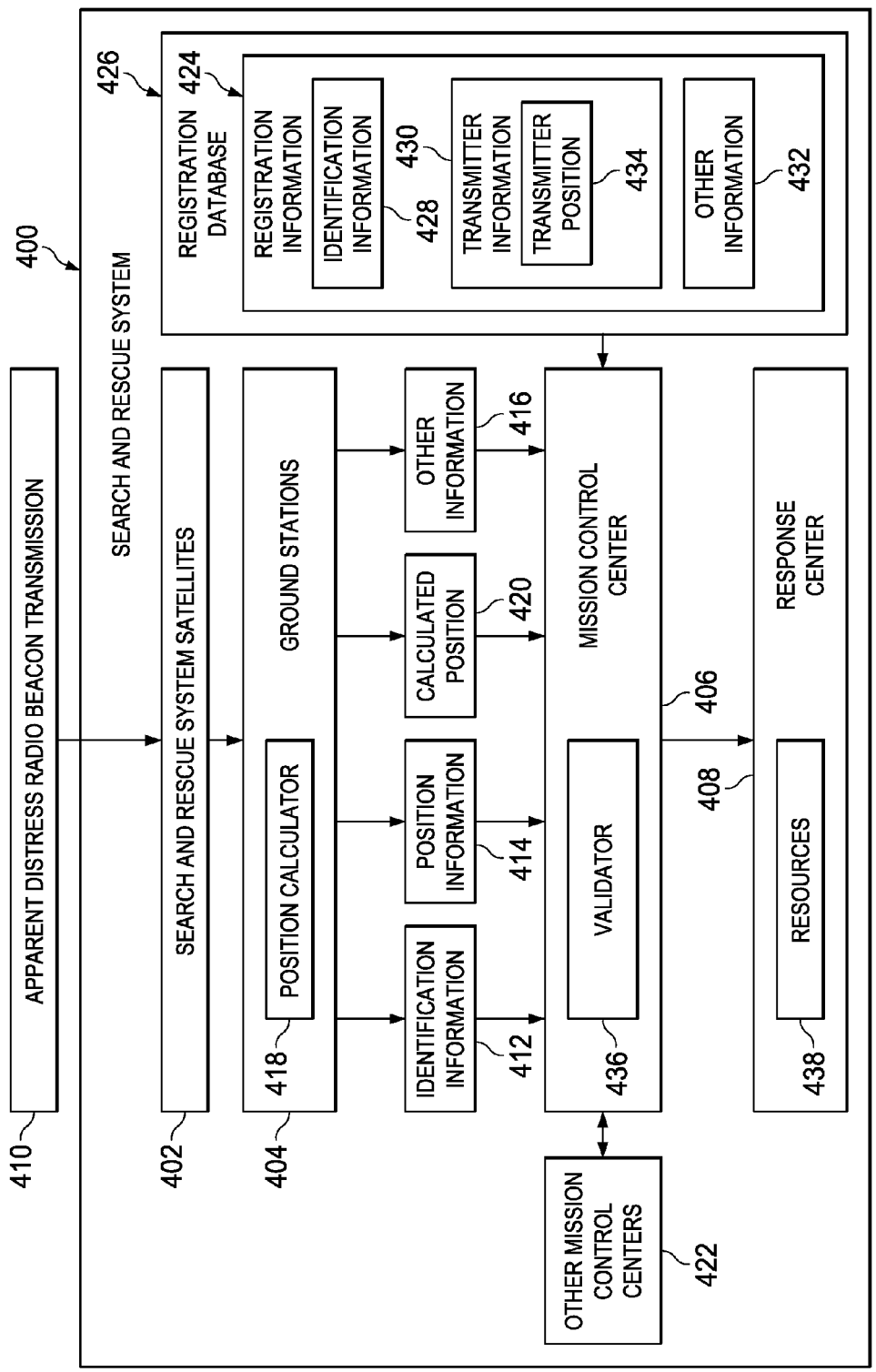
FIG. 4 is an illustration of a block diagram of a search and rescue system in accordance with an illustrative embodiment.

Turning to FIG. 4 an illustration of a block diagram of a search and rescue system is depicted in accordance with an illustrative embodiment. Search and rescue system 400 may be an example of one implementation of search and rescue system 104 in FIG. 1 and search and rescue system 206 in FIG. 2. For example, without limitation, search and rescue system 400 may comprise search and rescue system satellites 402, ground stations 404, mission control center 406, and response center 408.

Search and rescue system satellites 402 are configured to detect apparent distress radio beacon transmission 410 and relay apparent distress radio beacon transmission 410 to ground stations 404. Ground stations 404 are configured to receive and process apparent distress radio beacon transmission 410 from search and rescue system satellites 402. Ground stations 404 may extract identification information 412, position information 414, and other information 416 from received apparent distress radio beacon transmission 410 and forward such information to mission control center 406. Ground stations 404 also may include position calculator 418 for determining calculated position 420 of the transmission of apparent distress radio beacon transmission 410 using satellite orbit information and signal Doppler measurements in a known manner. Calculated position 420 also may be provided to mission control center 406.

Mission control center 406 may receive information from ground stations 404 and exchange information with other mission control centers 422. Mission control center 406 may use registration information 424 in registration database 426 to determine whether apparent distress radio beacon transmission 410 is an emulated distress radio beacon and to determine the appropriate response center 408 to notify. Registration information 424 may include, for example, without limitation, identification information 428, transmitter information 430, and other information 432.

Transmitter information 430 in registration information 424 may indicate that apparent distress radio beacon transmission 410 from an aircraft identified by identification information 428 is an emulated distress radio beacon transmission. Transmitter information 430 also may identify transmitter position 434 of the source of the emulated distress radio beacon transmission. Mission control center 406 may comprise validator 436 for validating a received emulated distress radio beacon transmission by comparing calculated position 420 for the transmission to transmitter position 434 as identified in registration information 424.

Response center 408 may include resources 438 for performing search and rescue operations. Response center 408 may use information provided by mission control center 406 to use resources 438 in an appropriate manner to perform a search and rescue operation in response to the received emulated distress radio beacon transmission.

The illustrations of FIGS. 2-4 are not meant to imply physical or architectural limitations to the manner in which different illustrative embodiments may be implemented. Other components in addition to, in place of, or in addition to and in place of the ones illustrated may be used. Some components may be unnecessary in some illustrative embodiments. Also, the blocks are presented to illustrate some functional components. One or more of these blocks may be combined, divided, or combined and divided into different blocks when implemented in different illustrative embodiments.

Figure 5:
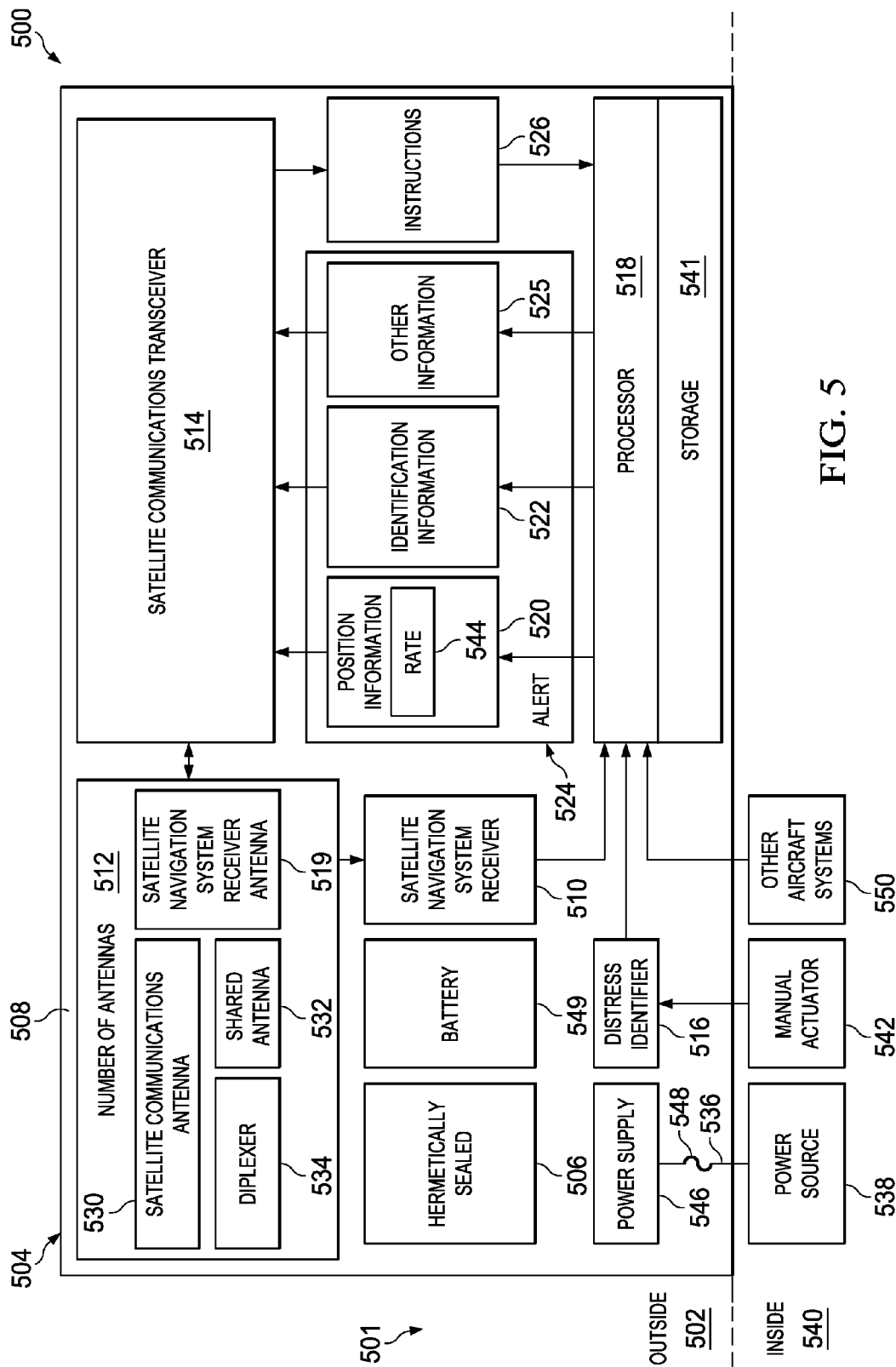
FIG. 5 is an illustration of a block diagram of a tracking device in accordance with an illustrative embodiment.

Turning to FIG. 5, an illustration of a block diagram of a tracking device is depicted in accordance with an illustrative embodiment. Tracking device 500 may be an example of one implementation of tracking device 112 on aircraft 102 in FIG. 1 or tracking device 208 on aircraft 202 in FIG. 2. For example, without limitation, tracking device 500 may be attached to aircraft 501 on outside 502 of aircraft 501.

Tracking device 500 comprises various electronics contained within housing 504. Housing 504 may be made in any appropriate manner of any appropriate material such that the electronics contained inside housing 504 are protected to maintain proper operation of tracking device 500 when tracking device 500 is attached to aircraft 501 on outside 502 of aircraft 501. For example, without limitation, the electronics may be hermetically sealed 506 within interior 508 of housing 504. The electronics may be hermetically sealed 506 within interior 508 of housing 504 using any appropriate materials and structures to provide an airtight seal between interior 508 of housing 504 and outside 502 of aircraft 501 when tracking device 500 is attached to aircraft 501 on outside 502 of aircraft 501. Electronics for tracking device 500 may include satellite navigation system receiver 510, number of antennas 512, satellite communications transceiver 514, distress identifier 516, and processor 518.

Satellite navigation system receiver 510 may be configured to receive navigation signals from satellites in a satellite navigation system via number of antennas 512. For example, without limitation, satellite navigation system receiver 510 may be configured to use satellite navigation system receiver antenna 519 in number of antennas 512 to receive the navigation signals. For example, without limitation, satellite navigation system receiver 510 may be configured to receive navigation signals from satellites in a global navigation satellite system such as the Global Positioning System (GPS), the Global Navigation Satellite System (GLONASS), another appropriate satellite navigations system, or from various combinations of satellite navigation systems. In accordance with an illustrative embodiment, the navigation signals received by satellite navigation system receiver 510 may be used to determine the position of aircraft 501.

Satellite communications transceiver 514 may be configured to send and receive information via a satellite communications system. For example, without limitation, satellite communications transceiver 514 may be configured to send and receive information via communications satellites in low Earth orbit, such as satellites in the Iridium network, other appropriate communications satellites, or various communications satellites from various combinations of satellite communications systems.

In accordance with an illustrative embodiment, satellite communications transceiver 514 may be used to send position information 520 to a receiving station via a satellite. Position information 520 may include information identifying the position determined using the navigation signals received by satellite navigation system receiver 510. In distinct embodiments, position information 520 may be augmented by additional information such as time stamps, and other aircraft navigation or aircraft state data.

Satellite communications transceiver 514 also may be used to send identification information 522, alert 524, other information 525, or various combinations of appropriate information to a receiving station via a satellite. Identification information 522 may include information identifying aircraft 501. Alert 524 may include information indicating that aircraft 501 is in distress.

Satellite communications transceiver 514 also may be configured to receive instructions 526 via a satellite. For example, without limitations, instructions 526 may include instructions for controlling operation of the electronics for tracking device 500.

Satellite communications transceiver 514 may use satellite communications antenna 530 in number of antennas 512 to send and receive communications from a communications satellite. Alternatively, satellite communications transceiver 514 and satellite navigation system receiver 510 may share the use of shared antenna 532 in number of antennas 512. In this case, diplexer 534 or another appropriate device may be used for separating and directing the appropriate signals from shared antenna 532 to satellite navigation system receiver 510 and satellite communications transceiver 514 and for directing any signals from satellite communications transceiver 514 to shared antenna 532.

Distress identifier 516 may be configured to identify when aircraft 501 is in distress. The functions performed by distress identifier 516 may be implemented in hardware or in software running on hardware. For example, without limitation, the functions performed by distress identifier 516 may be implemented, in whole or in part, in software running on processor 518. Alternatively, the functions performed by distress identifier 516 may be implemented entirely separately from processor 518.

Distress may include any undesired condition of aircraft 501. Distress identifier 516 may be configured to identify when aircraft 501 is in distress automatically in any appropriate manner. For example, without limitation, distress identifier 516 may determine that aircraft 501 is in distress when power for operation of electronics for tracking device 500 that is provided on power line 536 from power source 538 on inside 540 of aircraft 501 is interrupted.

In some distinct embodiments, a list or a matrix of indicators that aircraft 501 is in distress, or factors associated with aircraft 501 in distress, may be stored in storage 541 and used by distress identifier 516 to automatically determine that aircraft 501 is in distress. Examples of indicators that aircraft 501 is in distress may include abnormal position changes, abnormal deviations from flight plans, and abnormal commanded changes to the configuration of aircraft 501 that may put the aircraft in harm.

Alternatively, or in addition, distress identifier 516 may be configured to identify when aircraft 501 is in distress in response to the operation of manual actuator 542 by a human operator. Manual actuator 542 may comprise any appropriate actuation or signaling device that may be operated manually by a human operator inside 540 aircraft 501. For example, without limitation, distress identifier 516 may determine that aircraft 501 is in distress in response to manual activation of a switch or other appropriate manual actuator 542 by a human operator inside 540 aircraft 501. In this case, the switch or other appropriate one of manual actuator 542 may be connected to provide an appropriate signal to indicate distress to distress identifier 516 either by a wire or wirelessly in any appropriate manner.

Preferably, no interface or other capability is provided for a human operator inside 540 aircraft 501 to inhibit or cancel any such indication of distress that is provided to or determined by distress identifier 516. Limiting interfaces for controlling operation of tracking device 500 from inside 540 aircraft 501 in this manner may reduce or eliminate accidental or intentional tampering with the desirable operation of tracking device 500.

Distress identifier 516 may provide an appropriate indication to processor 518 in response to automatic or manual identification of distress by distress identifier 516. An indication that aircraft 501 is in distress may be provided from distress identifier 516 to processor 518 in any appropriate manner and form.

Processor 518 may be configured to control the operation of tracking device 500 including satellite navigation system receiver 510 and satellite communications transceiver 514. For example, processor 518 may be configured to use satellite navigation system receiver 510 to determine the position of aircraft 501 and to generate position information 520 identifying the position of aircraft 501 as identified using satellite navigation system receiver 510. Processor 518 may be configured to use satellite communications transceiver 514 to send position information 520 to a receiver station via a satellite. Processor 518 may be configured to generate and send position information 520 automatically at rate 544 while aircraft 501 is in flight.

Rate 544 may be defined by fixed intervals. Alternatively, processor 518 may be configured to change rate 544 for generating and sending position information 520 based on various conditions. For example, processor 518 may be configured to change rate 544 for generating and sending position information 520 based on the geographic location of aircraft 501. For example, without limitation, processor 518 may be configured to send updates for position information 520 more frequently when aircraft 501 is in flight over the ocean or in another remote location. Processor 518 may be configured to send position information updates less frequently when aircraft 501 is in flight in a location where aircraft 501 may be in sight of an air traffic control radar system or in another less remote location. Processor 518 also may be configured to generate and send position information 520 more frequently when it is determined that aircraft 501 is in distress.

Processor 518 also may be configured to generate and send alert 524 when it is determined that aircraft 501 is in distress. For example, alert 524 may be generated and sent by processor 518 to a receiving station via a satellite along with or in addition to position information 520 transmitted using satellite communications transceiver 514. For example, without limitation, alert 524 may include or be associated with position information 520 identifying the position of aircraft 501 when the distress started. For example, without limitation, alert 524 may include information identifying various characteristics of the distress, such as the condition or event that triggered the indication of distress or any other appropriate information or various combinations of information about the distress.

Processor 518 also may be configured to take appropriate action in response to instructions 526 received via a satellite and satellite communications transceiver 514. For example, without limitation, processor 518 may be configured to generate and send position information 520, change rate 544 for generating and sending position information 520, or take other appropriate actions or various combinations of actions in response to instructions 526 received via satellite communications transceiver 514.

Electronics for tracking device 500 may include power supply 546. Power supply 546 may be implemented in any appropriate manner to provide appropriate electrical power for operation of the various electronic components in tracking device 500 from electrical power provided to power supply 546 on power line 536. For example, without limitation, in the case where tracking device 500 is attached to aircraft 501 on outside 502 of aircraft 501, power line 536 may be connected to provide electrical power to power supply 546 from power source 538 on inside 540 of aircraft 501. Power source 538 may comprise any appropriate source of electrical power for operation of tracking device 500.

Power line 536 may be implemented in any appropriate manner to provide electrical power from an appropriate power source 538 to power supply 546 in tracking device 500. Various undesirable conditions on power line 536 may cause inconsistencies in power supply 546 or other electronics in tracking device 500. For example, without limitation, power line 536 may include circuit breaker 548. Circuit breaker 548 may be implemented in any known and appropriate manner to prevent undesirable conditions on power line 536 from reaching power supply 546 or other electronics in tracking device 500. For example, without limitation, circuit breaker 548 may be implemented in a known and appropriate manner to prevent excessive current, excessive voltage, excessive power, or any other undesirable condition or combination of undesirable conditions on power line 536 from reaching power supply 546 and other electronics for tracking device 500.

Electrical power for operation of tracking device 500 may include battery 549. Battery 549 may be contained in housing 504 along with the other electronic components of tracking device 500. Battery 549 may include any appropriate type and number of batteries for providing appropriate electrical power for operation of various electronic components in tracking device 500. Power for operation of tracking device 500 may be provided by battery 549 as an alternative or in addition to providing power for operation of tracking device 500 from power source 538 via power line 536. For example, without limitation, when power for operation of tracking device 500 is available from both battery 549 and from power source 538 via power line 536, battery 549 may be used to provide back-up power for operation of tracking device 500 when power on power line 536 is interrupted. For example, without limitation, when tracking device 500 is attached to aircraft 501 on outside 502 of aircraft 501, providing battery 549 for powering tracking device 500 may prevent accidental or intentional disabling of the operation of tracking device 500 from inside 540 of aircraft 501 by disrupting power for tracking device 500 that is provided on power line 536 from power source 538 located inside 540 of aircraft 501.

The different components illustrated for tracking device 500 are not meant to provide architectural limitations to the manner in which different embodiments may be implemented. The different illustrative embodiments may be implemented in a system including components in addition to or in place of those illustrated for tracking device 500. Other components shown in FIG. 5 can be varied from the illustrative examples shown.

For example, without limitation, processor 518 may also be configured to receive information identifying the position of aircraft 501 from other aircraft systems 550 on inside 540 of aircraft 501. Information provided by other aircraft systems 550 may be used for back-up, calibration, testing, or in comparison with the position of aircraft 501 identified using satellite navigation system receiver 510.

Electronics for tracking device 500 may be implemented in any appropriate manner using any appropriate hardware or hardware in combination with software. For example, without limitation, processor 518 may be configured to execute instructions for software that may be loaded or otherwise stored in storage 541. Processor 518 may be a number of processors, a multi-processor core, or some other type of processor, depending on the particular implementation. Further, processor 518 may be implemented using a number of heterogeneous processor systems in which a main processor is present with secondary processors on a single chip. As another illustrative example, processor 518 may be a symmetric multi-processor system containing multiple processors of the same type.

Storage 541 may include memory, persistent storage, or any other appropriate storage devices or various combinations of storage devices. Storage 541 may comprise any piece of hardware that is capable of storing information, such as, for example, without limitation, data, program code in functional form, and/or other suitable information either on a temporary basis and/or a permanent basis. Storage 541 may also be referred to as a computer readable storage device in these examples. Storage 541, in these examples, may be, for example, a random access memory or any other suitable volatile or non-volatile storage device. Storage 541 may take various forms, depending on the particular implementation. For example, storage 541 may be implemented, in whole or in part, as part of processor 518. Alternatively, storage 541 may be implemented entirely separate from processor 518.

In any case, instructions for the operating system, applications, and/or programs may be located in storage 541, which is in communication with processor 518 in any appropriate manner. The processes of the different embodiments may be performed by processor 518 using computer-implemented instructions, which may be located in storage 541. These instructions may be referred to as program instructions, program code, computer usable program code, or computer-readable program code that may be read and executed by processor 518. The program code in the different embodiments may be embodied on different physical or computer-readable storage media.

In these examples, storage 541 may be a physical or tangible storage device used to store program code rather than a medium that propagates or transmits program code. In this case, storage 541 may be referred to as a computer-readable tangible storage device or a computer-readable physical storage device. In other words, storage 541 is embodied in a medium that can be touched by a person.

Alternatively, program code may be transferred to processor 518 using computer-readable signal media. Computer-readable signal media may be, for example, a propagated data signal containing program code. For example, computer-readable signal media may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples. In some illustrative embodiments, program code may be downloaded over a network to storage 541 from another device or data processing system through computer-readable signal media for use within processor 518.

The different embodiments may be implemented using any hardware device or system capable of running program code. As one example, electronics for tracking device 500 may include organic components integrated with inorganic components and/or may be comprised entirely of organic components excluding a human being. For example, storage 541 may be comprised of an organic semiconductor.

In another illustrative example, processor 518 may take the form of a hardware unit that has circuits that are manufactured or configured for a particular use. This type of hardware may perform operations without needing program code to be loaded in storage 541 to be configured to perform the operations.

For example, when processor 518 takes the form of a hardware unit, processor 518 may be a circuit system, an application-specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include a programmable logic array, programmable array logic, a field programmable logic array, a field programmable gate array, and other suitable hardware devices. With this type of implementation, program code may be omitted, because the processes for the different embodiments are implemented in a hardware unit.

In still another illustrative example, processor 518 may be implemented using a combination of processors found in computers and hardware units. Processor 518 may have a number of hardware units and a number of processors that are configured to run program code. With this depicted example, some of the processes may be implemented in the number of hardware units, while other processes may be implemented in the number of processors.

Figure 6:
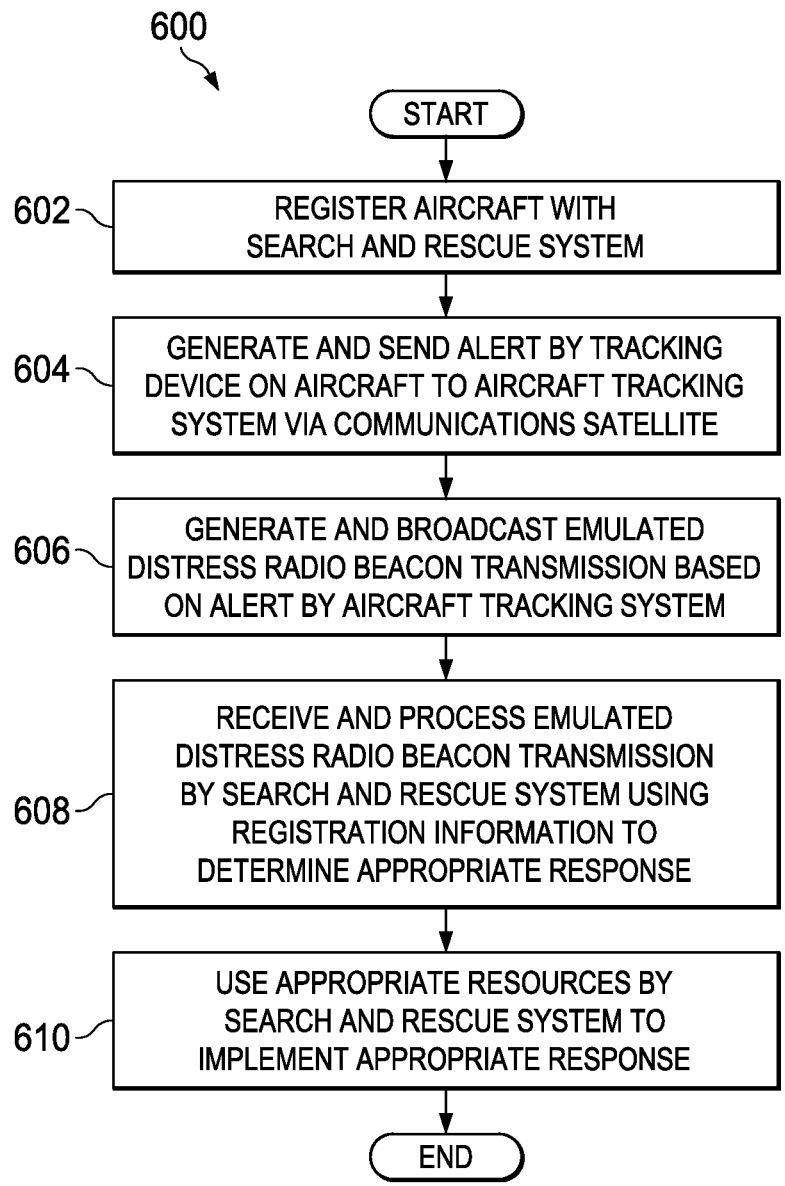
FIG. 6 is an illustration of a flowchart of a process of using an alert from an aircraft to perform a search and rescue operation in accordance with an illustrative embodiment.

Turning to FIG. 6, an illustration of a flowchart of a process of using an alert from an aircraft to perform a search and rescue operation is depicted in accordance with an illustrative embodiment. Process 600 may be implemented, for example, in aircraft operating environment 100 in FIG. 1 or in aircraft operating environment 200 in FIG. 2.

Process 600 may begin with registering an aircraft with a search and rescue system (operation 602). For example, without limitation, operation 602 may include providing appropriate registration information to the search and rescue system so that the search and rescue system may identify what is apparently a transmission from an emergency locator transmitter on the aircraft as an emulated emergency locator transmitter transmission from a location other than the aircraft.

A tracking device on the aircraft then may generate and send an alert to an aircraft tracking system via a communications satellite (operation 604). The aircraft tracking system then may generate and broadcast an emulated distress radio beacon transmission based on the alert received from the aircraft (operation 606). The emulated distress radio beacon transmission may be received by a search and rescue system and processed by the search and rescue system to determine an appropriate response (operation 608). The search and rescue system then may use appropriate resources to implement the appropriate response (operation 610), with the process terminating thereafter.

Figure 7:
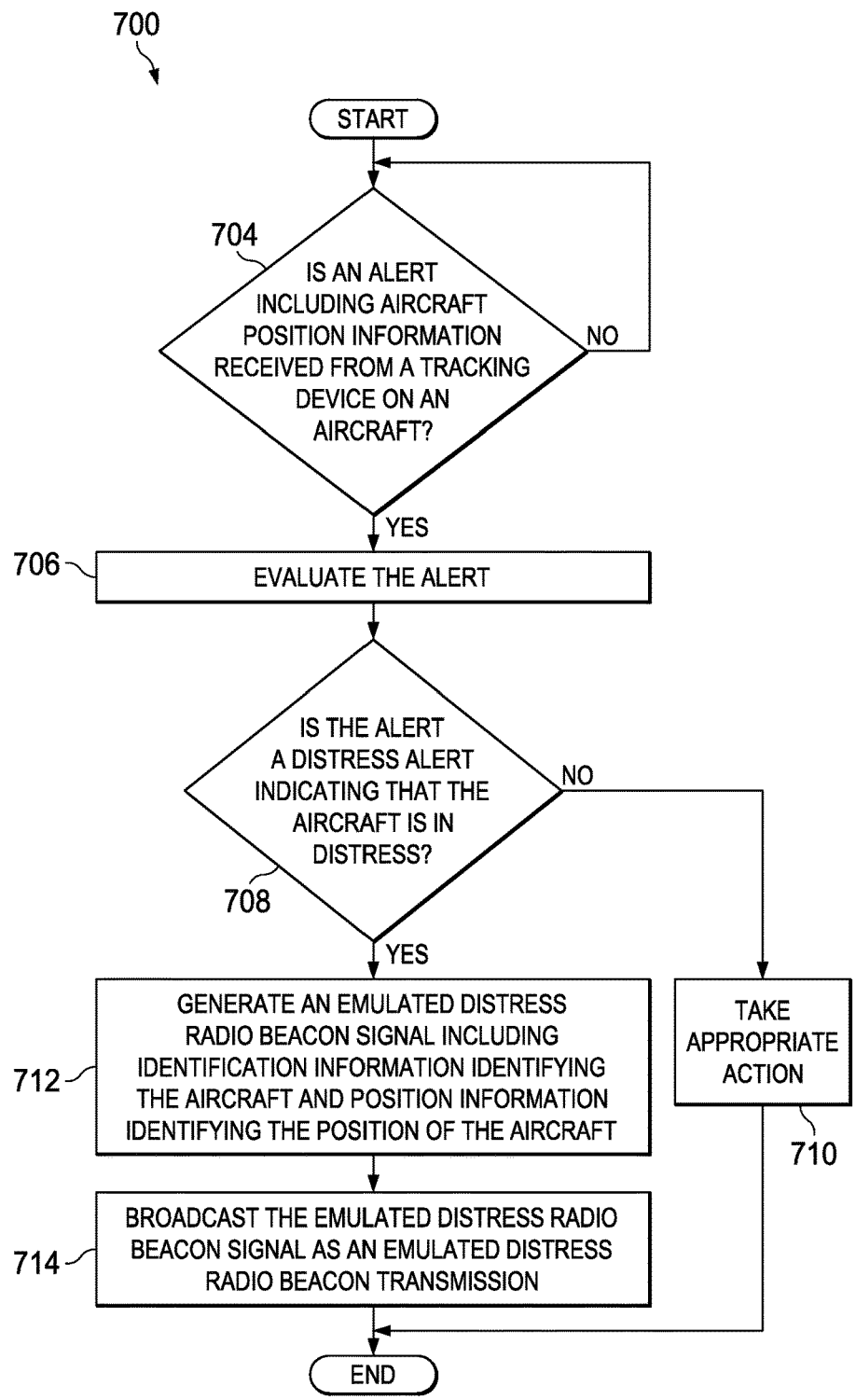
FIG. 7 is an illustration of a flowchart of a process for delivering an alert from an aircraft to a search and rescue system in accordance with an illustrative embodiment.

Turning to FIG. 7, an illustration of a flowchart of a process for delivering an alert from an aircraft to a search and rescue system is depicted in accordance with an illustrative embodiment. For example, without limitation, process 700 may be implemented by aircraft tracking system 300 in FIG. 3.

Process 700 may begin with determining whether an alert, including aircraft identification information and position information, is received from a tracking device on an aircraft (operation 704). Operation 704 may be repeated until an alert is received from an aircraft.

When it is determined in operation 704 that an alert is received from an aircraft, the alert may be evaluated (operation 706). Evaluating the received alert may include determining whether the alert is a distress alert indicating that the aircraft is in distress (operation 708). When the alert is not a distress alert, appropriate action may be taken (operation 710). In this case, the appropriate action taken in operation 710 does not include alerting a search and rescue system.

When it is determined in operation 708 that the received alert is a distress alert, an emulated distress radio beacon signal including the identification information and the position information may be generated (operation 712). The emulated distress radio beacon signal then may be broadcast (operation 714), with the process terminating thereafter.

Figure 8:
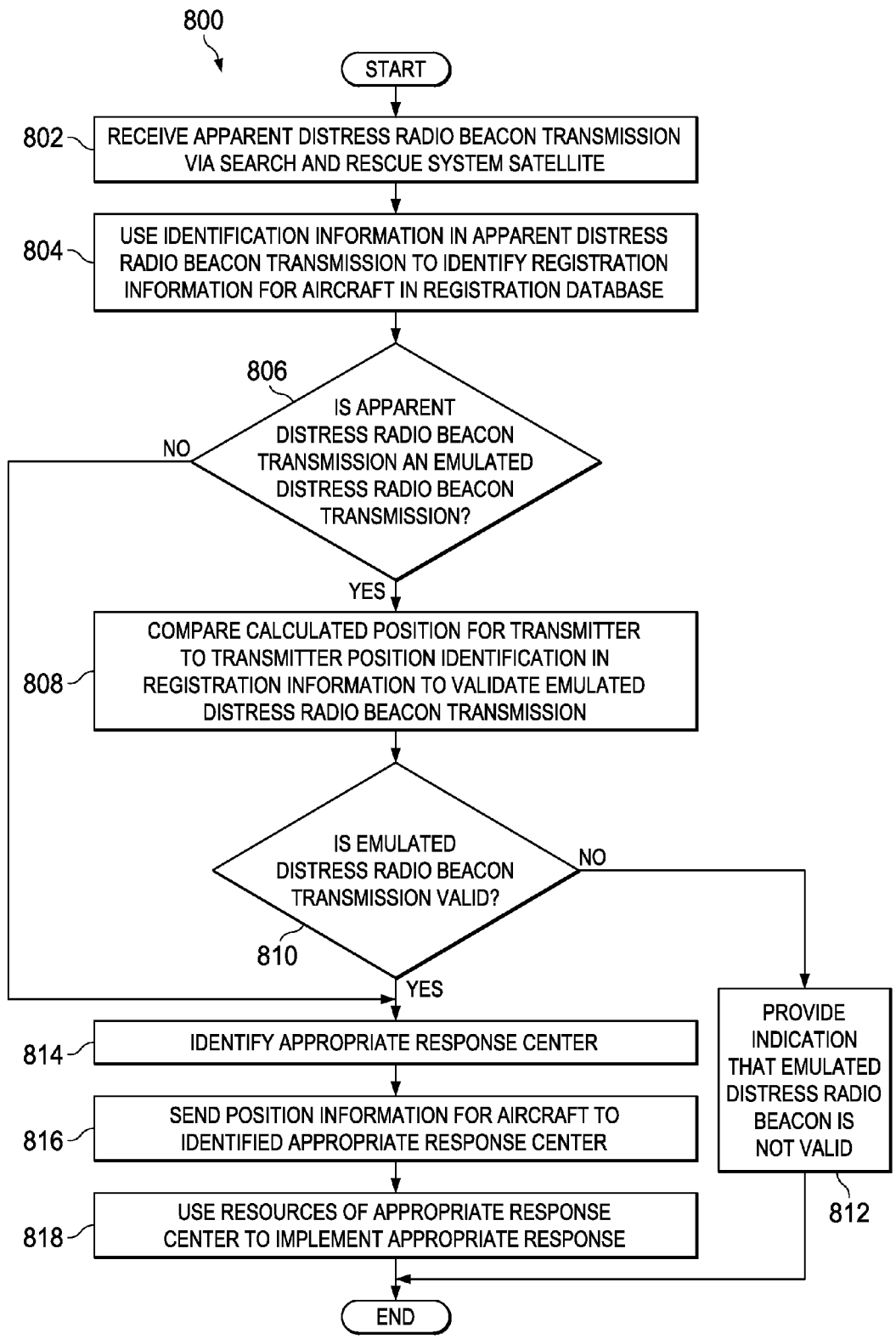
FIG. 8 is an illustration of a flowchart of a process for using an alert from an aircraft to perform a search and rescue operation in accordance with an illustrative embodiment.

Turning to FIG. 8, an illustration of a flowchart of a process of using an alert from an aircraft to perform a search and rescue operation is depicted in accordance with an illustrative embodiment. Process 800 may be performed, for example, by search and rescue system 400 in FIG. 4.

Process 800 may begin with receiving an apparent distress radio beacon transmission via a search and rescue system satellite (operation 802). Identification information in the apparent distress radio beacon transmission may be used to identify registration information for the aircraft in a registration database (operation 804). The identified registration information then may be used to determine whether the apparent distress radio beacon transmission is an emulated distress radio beacon transmission (operation 806). If it is determined at operation 806 that the apparent distress radio beacon transmission is an emulated distress radio beacon transmission, a calculated position for the transmitter may be compared to information identifying the transmitter position in the registration information (operation 810).

It then may be determined whether the emulated distress radio beacon transmission is valid (operation 810). If it is determined that the emulated distress radio beacon transmission is not valid, an indication that the emulated distress radio beacon is not valid may be provided (operation 812), with the process terminating thereafter. If it is determined that the emulated distress radio beacon transmission is valid, an appropriate response center may be identified (operation 814), position information for the aircraft may be sent to the identified appropriate response center (operation 816), and resources may be used by the appropriate response center to implement an appropriate response (operation 818), with the process terminating thereafter.

Figure 9:
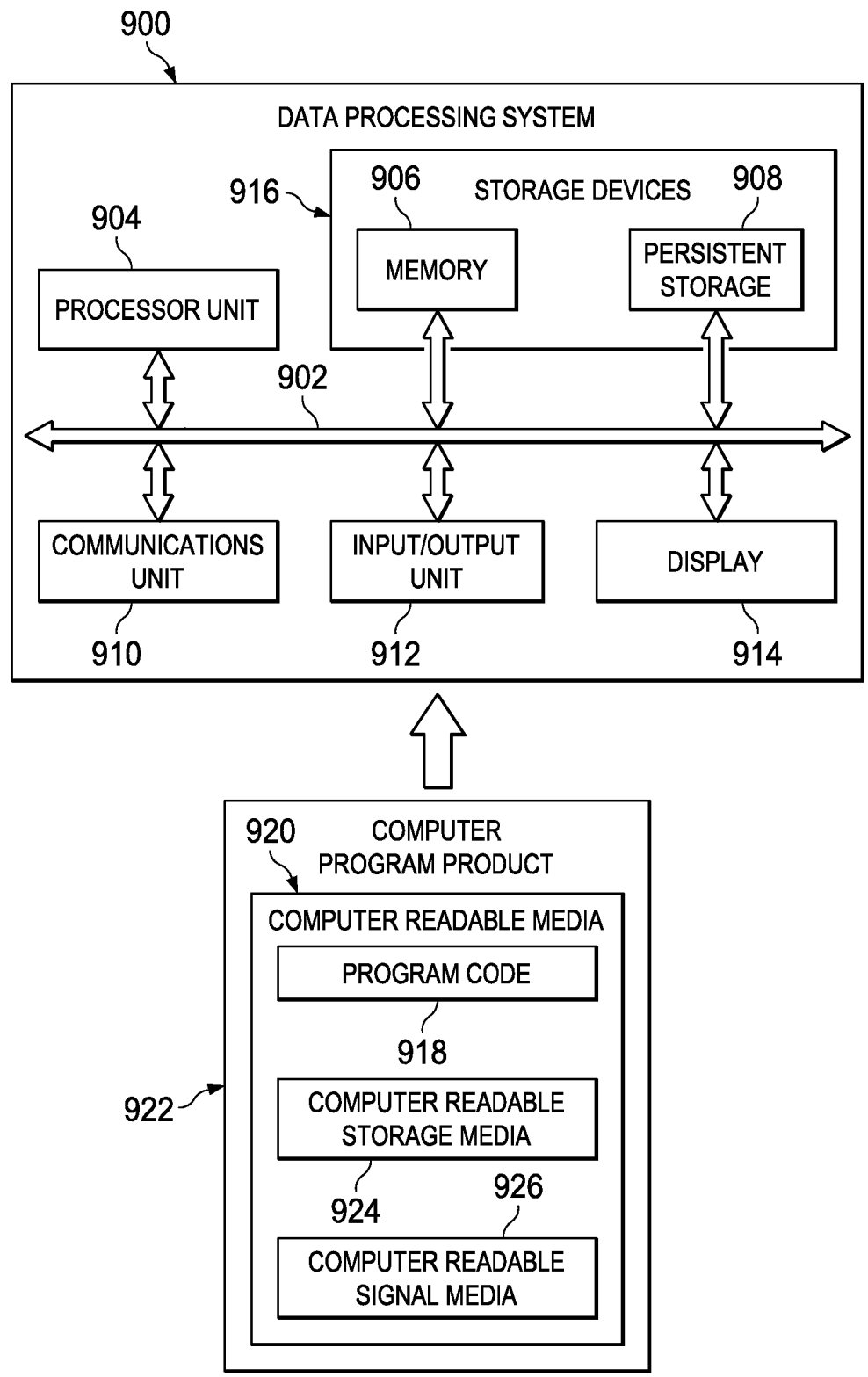
FIG. 9 is an illustration of a block diagram of a data processing system in accordance with an illustrative embodiment.

Turning to FIG. 9, an illustration of a block diagram of a data processing system on which various functions may be implemented is depicted in accordance with an illustrative embodiment. In this illustrative example, data processing system 900 includes communications fabric 902. Communications fabric 902 provides communications between processor unit 904, memory 906, persistent storage 908, communications unit 910, input/output (I/O) unit 912, and display 914.

Processor unit 904 serves to execute instructions for software that may be loaded into memory 906. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer-readable storage devices in these examples. Memory 906 may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program instructions, program code, computer-usable program code, or computer-readable program code that may be read and executed by a processor in processor unit 904. The program code in the different embodiments may be embodied on different physical or computer-readable storage media 924, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these examples. In one example, computer-readable media 920 may be computer-readable storage media 924 or computer-readable signal media 926.

Computer-readable storage media 924 may include, for example, an optical or magnetic disk that is inserted or placed into a drive or other device that is part of persistent storage 908 for transfer onto a storage device, such as a hard drive, that is part of persistent storage 908. Computer-readable storage media 924 also may take the form of a persistent storage, such as a hard drive, a thumb drive, or a flash memory, that is connected to data processing system 900. In some instances, computer-readable storage media 924 may not be removable from data processing system 900.

In these examples, computer-readable storage media 924 is a physical or tangible storage device used to store program code 918 rather than a medium that propagates or transmits program code 918. Computer-readable storage media 924 is also referred to as a computer-readable tangible storage device or a computer-readable physical storage device. In other words, computer-readable storage media 924 is a medium that can be touched by a person.

Alternatively, program code 918 may be transferred to data processing system 900 using Computer-readable signal media 926. Computer-readable signal media 926 may be, for example, a propagated data signal containing program code 918. For example, computer-readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer-readable signal media 926 for use within data processing system 900. For instance, program code stored in a computer-readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application-specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system.

Additionally, communications unit 910 may include a number of devices that transmit data, receive data, or transmit and receive data. Communications unit 910 may be, for example, a modem or a network adapter, two network adapters, or some combination thereof. Further, a memory may be, for example, memory 906, or a cache, such as those found in an interface and memory controller hub that may be present in communications fabric 902.

The flowcharts and block diagrams in the different depicted embodiments illustrate the architecture, functionality, and operation of some possible implementations of apparatuses and methods in illustrative embodiments. In this regard, each block in the flowcharts or block diagrams may represent a module, segment, function, and/or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order shown in the figures. For example, in some cases, two blocks shown in succession may be executed substantially concurrently, or the blocks may sometimes be performed in the reverse order, depending upon the functionality involved. Also, other blocks may be added in addition to the blocks illustrated in a flowchart or block diagram.

The description of the different illustrative embodiments has been presented for purposes of illustration and description, and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of delivering an alert from an aircraft to a search and rescue system, comprising:
receiving the alert by a receiver in an aircraft tracking system from a tracking device on the aircraft via a communications satellite, wherein the alert comprises identification information identifying the aircraft and position information identifying a position of the aircraft;
in response to receiving the alert, generating an emulated distress radio beacon signal by a formatter in the aircraft tracking system, wherein the emulated distress radio beacon signal comprises the identification information and the position information in a format of a signal generated by a distress radio beacon;
broadcasting the emulated distress radio beacon signal by a transmitter in the aircraft tracking system from a location other than the aircraft as an emulated distress radio beacon transmission that is configured to be received and processed by the search and rescue system; and
sending registration information by the aircraft tracking system to the search and rescue system before broadcasting the emulated distress radio beacon signal, wherein the registration information indicates that an apparent distress radio beacon transmission that identifies the aircraft is the emulated distress radio beacon transmission.

2. The method of claim 1, wherein:
generating the emulated distress radio beacon signal comprises generating an emulated emergency locator transmitter signal in a format of a signal generated by an emergency locator transmitter; and
broadcasting the emulated distress radio beacon signal comprises broadcasting the emulated emergency locator transmitter signal from the location other than the aircraft as an emulated emergency locator transmitter transmission that is configured to be received and processed by the search and rescue system.

3. The method of claim 2, wherein broadcasting the emulated emergency locator transmitter signal comprises broadcasting the emulated emergency locator transmitter signal at approximately 406 MHz to emulate a transmission from an emergency locator transmitter.

4. The method of claim 1, wherein the registration information comprises transmitter information identifying the location other than the aircraft of the transmitter for broadcasting the emulated distress radio beacon signal.

5. The method of claim 1 further comprising:
evaluating the alert from the aircraft by an evaluator in the aircraft tracking system to determine whether the alert is a distress alert indicating that the aircraft is in distress; and
generating and broadcasting the emulated distress radio beacon signal in response to a determination that the alert is the distress alert.

6. The method of claim 1, wherein the alert is received from the aircraft via the communications satellite in low Earth orbit.

7. The method of claim 6, wherein the alert is received from the aircraft via an Iridium communications satellite.

8. The method of claim 1, wherein the alert is generated by the tracking device on the aircraft comprising:
a satellite navigation system receiver configured to identify the position of the aircraft using navigation signals received from a satellite navigation system;
a satellite communications transceiver;
a number of antennas for the satellite navigation system receiver and the satellite communications transceiver;
a distress identifier configured to identify when the aircraft is in distress;
a processor configured to generate the position information identifying the position of the aircraft as identified by the satellite navigation system receiver, generate the alert, and send the alert via the communications satellite using the satellite communications transceiver in response to a determination by the distress identifier that the aircraft is in distress; and
a housing attached to the aircraft on an outside of the aircraft and containing the satellite navigation system receiver, the satellite communications transceiver, the number of antennas, the distress identifier, and the processor.

9. An apparatus, comprising:
a receiver configured to receive an alert from an aircraft via a communications satellite, wherein the alert comprises identification information identifying the aircraft and position information identifying a position of the aircraft;
a formatter configured to generate an emulated distress radio beacon signal comprising the identification information and the position information in a format of a signal generated by a distress radio beacon; and
a transmitter configured to broadcast the emulated distress radio beacon signal from a location other than the aircraft as an emulated distress radio beacon transmission that is configured to be received and processed by a search and rescue system; and
wherein the apparatus is further configured to send registration information to the search and rescue system before the emulated distress radio beacon signal is broadcast, wherein the registration information indicates that an apparent distress radio beacon transmission that identifies the aircraft is the emulated distress radio beacon transmission.

10. The apparatus of claim 9, wherein:
the formatter is configured to generate the emulated distress radio beacon signal as an emulated emergency locator transmitter signal in a format of a signal generated by an emergency locator transmitter; and
the transmitter is configured to broadcast the emulated emergency locator transmitter signal from the location other than the aircraft as an emulated emergency locator transmitter transmission that is configured to be received and processed by the search and rescue system.

11. The apparatus of claim 10, wherein the transmitter is configured to broadcast the emulated emergency locator transmitter signal at approximately 406 MHz to emulate a transmission from an emergency locator transmitter.

12. The apparatus of claim 9, wherein the alert comprises distress information indicating whether the aircraft is in distress.

13. The apparatus of claim 12 further comprising:
an evaluator configured to evaluate the distress information in the alert from the aircraft to determine whether the alert is a distress alert indicating that the aircraft is in distress; and wherein the formatter is configured to generate the emulated distress radio beacon signal in response to a determination that the alert is the distress alert.

14. A system, comprising:
a tracking device on an aircraft configured to send an alert from the aircraft via a communications satellite, wherein the alert comprises identification information identifying the aircraft and position information identifying a position of the aircraft;
an aircraft tracking system configured to receive the alert from the aircraft, generate an emulated distress radio beacon signal comprising the identification information and the position information in a format of a signal generated by a distress radio beacon, and broadcast the emulated distress radio beacon signal from a location other than the aircraft as an emulated distress radio beacon transmission; and
a search and rescue system configured to receive the emulated distress radio beacon transmission as an apparent distress radio beacon transmission via a search and rescue system satellite, receive registration information before receiving the emulated distress radio beacon transmission, wherein the registration information indicates that that the apparent distress radio beacon transmission that identifies the aircraft is the emulated distress radio beacon signal, and use the identification information and the position information to conduct a search and rescue operation.

15. The system of claim 14, wherein the tracking device on the aircraft comprises:
a satellite navigation system receiver configured to identify the position of the aircraft using navigation signals received from a satellite navigation system;
a satellite communications transceiver;
a number of antennas for the satellite navigation system receiver and the satellite communications transceiver;
a distress identifier configured to identify when the aircraft is in distress;
a processor configured to generate the position information identifying the position of the aircraft as identified by the satellite navigation system receiver, generate the alert, and send the alert via the communications satellite using the satellite communications transceiver in response to a determination by the distress identifier that the aircraft is in distress; and
a housing attached to the aircraft on an outside of the aircraft and containing the satellite navigation system receiver, the satellite communications transceiver, the number of antennas, the distress identifier, and the processor.

16. The system of claim 14, wherein the aircraft tracking system comprises:
a receiver configured to receive the alert from the aircraft via the communications satellite, wherein the communications satellite is in a low Earth orbit;
a formatter configured to generate the emulated distress radio beacon signal as an emulated emergency locator transmitter signal in a standard format of a signal generated by an emergency locator transmitter; and
a transmitter configured to broadcast the emulated distress radio beacon signal as an emulated emergency locator transmitter transmission.

17. The system of claim 14, wherein the search and rescue system comprises the COSPAS-SARSAT search and rescue system.

18. A method of using an alert from an aircraft to perform a search and rescue operation, comprising:
receiving, by a search and rescue system, an apparent distress radio beacon transmission comprising identification information identifying the aircraft and position information identifying a position of the aircraft;
using the identification information, by the search and rescue system, to identify registration information for the aircraft indicating whether the apparent distress radio beacon transmission is an emulated distress radio beacon transmission transmitted from a transmitter that is not a distress radio beacon located on the aircraft; and
using the position information, by the search and rescue system, to perform the search and rescue operation in response to a determination that the apparent distress radio beacon transmission is the emulated distress radio beacon transmission transmitted from the transmitter that is not the distress radio beacon located on the aircraft.

19. The method of claim 18, wherein:
receiving the apparent distress radio beacon transmission comprises receiving the apparent distress radio beacon transmission via a search and rescue system satellite; and
the registration information comprises transmitter information identifying a location of the transmitter; and further comprising:
determining a calculated position of the transmitter using orbit information for the search and rescue system satellite and signal Doppler measurements for the apparent distress radio beacon transmission; and
comparing the location of the transmitter as identified in the registration information to the calculated position to determine whether the apparent distress radio beacon transmission is valid.

* * * * *